(12) United States Patent
Feng et al.

(10) Patent No.: US 12,041,402 B2
(45) Date of Patent: Jul. 16, 2024

(54) UPRIGHT SOUNDBAR WITH PROJECTION FUNCTION

(71) Applicant: LUXSHARE PRECISION INDUSTRY COMPANY LIMITED, Shenzhen (CN)

(72) Inventors: Yun Feng, Shenzhen (CN); GuoQin Huang, Shenzhen (CN); Yong Huang, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 204 days.

(21) Appl. No.: 17/870,310

(22) Filed: Jul. 21, 2022

(65) Prior Publication Data
US 2023/0133828 A1    May 4, 2023

(30) Foreign Application Priority Data

Oct. 28, 2021 (CN) .......................... 202122617570.3

(51) Int. Cl.
| | |
|---|---|
| *H04R 1/02* | (2006.01) |
| *G02B 13/16* | (2006.01) |
| *G02B 13/24* | (2006.01) |
| *H04N 9/31* | (2006.01) |
| *H04N 23/57* | (2023.01) |
| *H04N 23/60* | (2023.01) |

(52) U.S. Cl.
CPC ............. *H04R 1/028* (2013.01); *G02B 13/16* (2013.01); *G02B 13/24* (2013.01); *H04N 9/3141* (2013.01); *H04N 23/57* (2023.01); *H04N 23/60* (2023.01); *H04R 2499/15* (2013.01)

(58) Field of Classification Search
CPC .... H04R 1/028; H04R 2499/15; G02B 13/16; G02B 13/24; H04N 9/3141; H04N 23/57; H04N 23/60; H04N 23/51; G03B 29/00; G03B 31/00
See application file for complete search history.

(56) References Cited

U.S. PATENT DOCUMENTS

| | | |
|---|---|---|
| D540,762 S | 4/2007 | Lunde |
| D565,081 S | 3/2008 | Ishikawa |
| D670,268 S | 11/2012 | Allen |
| D680,143 S | 4/2013 | Henssler et al. |
| D689,112 S | 9/2013 | Henssler et al. |
| 9,294,840 B1 * | 3/2016 | Anderson ................ H04R 5/00 |
| D788,062 S | 5/2017 | Norrell |
| D853,361 S | 7/2019 | Ding |
| D935,513 S | 11/2021 | Shiono et al. |

(Continued)

*Primary Examiner* — Yosef K Laekemariam
(74) *Attorney, Agent, or Firm* — Birch, Stewart, Kolasch & Birch, LLP

(57) ABSTRACT

An upright soundbar with projection function including an upright body, a projection module, a camera module, a computing module and a base is provided. A first projection lens of the projection module is tilted, a first projection angle is between a first projection optical axis of the first projection lens and a horizontal line, the first projection angle ranges from 15 degrees to 60 degrees, a projection direction of the projection module and a photography direction of the camera module are reversed with respect to each other, and the upright body is movable along a vertical direction with respect to the base.

13 Claims, 9 Drawing Sheets

(56) References Cited

U.S. PATENT DOCUMENTS

| | | |
|---|---|---|
| D953,607 S | 5/2022 | Chen |
| D966,401 S | 10/2022 | Shiono et al. |
| D975,164 S | 1/2023 | Cheng et al. |
| D982,204 S | 3/2023 | Zhou |
| D985,177 S | 5/2023 | Browning |
| D989,842 S | 6/2023 | Cheng |
| D994,002 S | 8/2023 | Yang |
| D994,200 S | 8/2023 | Li |
| D996,690 S | 8/2023 | Liu et al. |
| D1,001,871 S | 10/2023 | Gao |
| 2014/0184725 A1* | 7/2014 | Wu ..................... H04N 9/3179 348/14.07 |
| 2020/0084538 A1 | 3/2020 | Brown et al. |
| 2021/0321196 A1 | 10/2021 | Riggs et al. |

* cited by examiner

UPRIGHT SOUNDBAR WITH PROJECTION FUNCTION

CROSS REFERENCE TO RELATED APPLICATION

This application claims the priority benefit of Chinese Patent Application Serial Number 202122617570.3, filed on Oct. 28, 2021, the full disclosure of which is incorporated herein by reference.

BACKGROUND

Technical Field

The present disclosure relates to the technical field of an upright soundbar, particularly to an upright soundbar with projection function.

Related Art

Because soundbar is an independent sound device and built with a plurality of speakers for different sound fields, many users will buy a soundbar to replace speakers at home TV, so as to get better audio-visual enjoyment.

However, current soundbar need to be placed in a horizontal manner or hanging on a wall, so it will take up more space and is not easy to install. On the other hand, when the soundbar is used in corporate meetings, they need to be further connected electrically with devices such as projectors, computers, cameras, etc., and thus there is a problem of system compatibility. In addition, in a limited meeting space, to place the devices such as the soundbar, the projectors, the computers and the cameras not only has a high construction cost, but will also have complex maintenance and repair problems at the same time.

In view of this, how to provide a soundbar that can be set up with a small floor space, and can be used as a projector, camera, etc. to save the related installation costs at the same time is a problem that needs to be solved urgently in the industry.

SUMMARY

Embodiments of the present disclosure provide an upright soundbar, which can solve a problem that when a soundbar is placed in a horizontal way or hanging on a wall will take up more space and not easy to install. Meanwhile, the present disclosure can solve a problem of system compatibility when the soundbar is used in corporate meetings, which need to be further connected with devices such as projectors, computers, and cameras.

In order to solve the above technical problems, the present disclosure is realized in this way:

An upright soundbar with projection function is provided, which comprises:
  an upright body having a top portion, a bottom portion disposed relative to the top portion, and a receiving space located in the upright body;
  a projection module, disposed in a first recessed area of the top portion;
  a camera module, disposed on an end surface of the top portion;
  a computing module, disposed in the receiving space; and
  a base, disposed on the bottom portion to support the upright body;
  wherein a first projection lens of the projection module is tilted, a first projection angle is between a first projection optical axis of the first projection lens and a horizontal line, the first projection angle ranges from 15 degrees to 60 degrees, a projection direction of the projection module and a photography direction of the camera module are reversed with respect to each other, and the upright body is movable along a vertical direction with respect to the base.

In the upright soundbar with projection function of the present disclosure, the projection module comprises a second projection lens, the second projection lens is tilted in a second recessed area of the top portion, a second projection angle is between a second projection optical axis of the second projection lens and the horizontal line, and the second projection angle ranges from 45 degrees to 80 degrees.

In the upright soundbar with projection function of the present disclosure, further comprises a plurality of speakers, wherein the plurality of speakers are disposed on a body end surface of the upright body.

In the upright soundbar with projection function of the present disclosure, the body end surface is a front-end surface, a left end surface or a right end surface of the upright body.

In the upright soundbar with projection function of the present disclosure, the plurality of speakers comprise at least one woofer and at least one tweeter.

In the upright soundbar with projection function of the present disclosure, further comprises a motor, wherein the motor is disposed in the receiving space, the motor drives the upright body to move a first height along the vertical direction, and the first height ranges from 0 mm to 200 mm.

In the upright soundbar with projection function of the present disclosure, the projection module is an ultra-short focus projection module.

In the upright soundbar with projection function of the present disclosure, the camera module is an automatic tracking camera module.

In the upright soundbar with projection function of the present disclosure, the computing module is a microcomputer host.

In the upright soundbar with projection function of the present disclosure, further comprises a plurality of transmission ports, wherein the plurality of transmission ports are disposed at a base end surface of the base, and the base end surface is not covered by the upright body.

In the upright soundbar with projection function of the present disclosure, the base is an inverted T-shaped base.

In the upright soundbar with projection function of the present disclosure, further comprises a light-emitting ring, wherein the light-emitting ring is disposed around the upright body.

In the upright soundbar with projection function of the present disclosure, further comprises a mesh housing, wherein the mesh housing covers the upright body.

In the embodiment of the disclosure, the soundbar that originally needs to be placed or suspended in a horizontal manner is changed to a vertical design, so that only a small area of ground space is required to complete an arrangement operation. At the same time, because the upright soundbar with projection function itself already has function of a projector and a camera, it can eliminate compatibility problems when the devices electrically connected to each other, while not having to purchase additional projectors or cameras to save the related device construction costs.

BRIEF DESCRIPTION OF THE DRAWINGS

The accompanying drawings illustrated herein are used to provide a further understanding of the present disclosure and form part of the present disclosure. The embodiments of the present disclosure and the description thereof are used to explain the present disclosure and do not constitute an undue limitation of the present disclosure.

DETAILED DESCRIPTION OF THE EMBODIMENTS

The technical solution in the embodiments of the present disclosure will be clearly and completely described below with reference to the accompanying drawings in the embodiments of the present disclosure. It is to be understood that the described embodiments are merely exemplary of the disclosure, and not restrictive of the full scope of the invention. All other embodiments, which can be obtained by a person skilled in the art without inventive step based on the embodiments of the present disclosure, are within the scope of the present disclosure.

Figure 1:
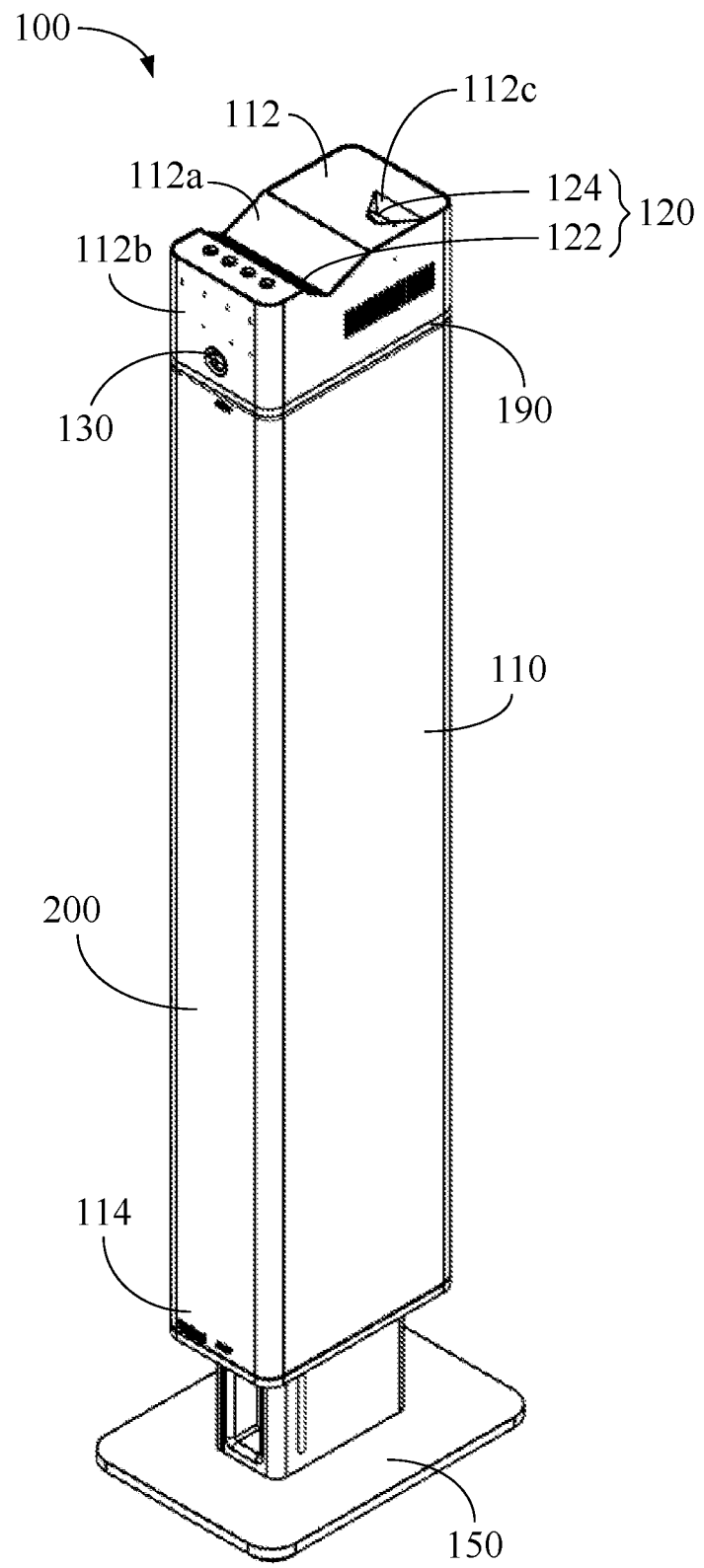
FIG. 1 is a perspective view of an upright soundbar with projection function of the present disclosure.
Figure 2:
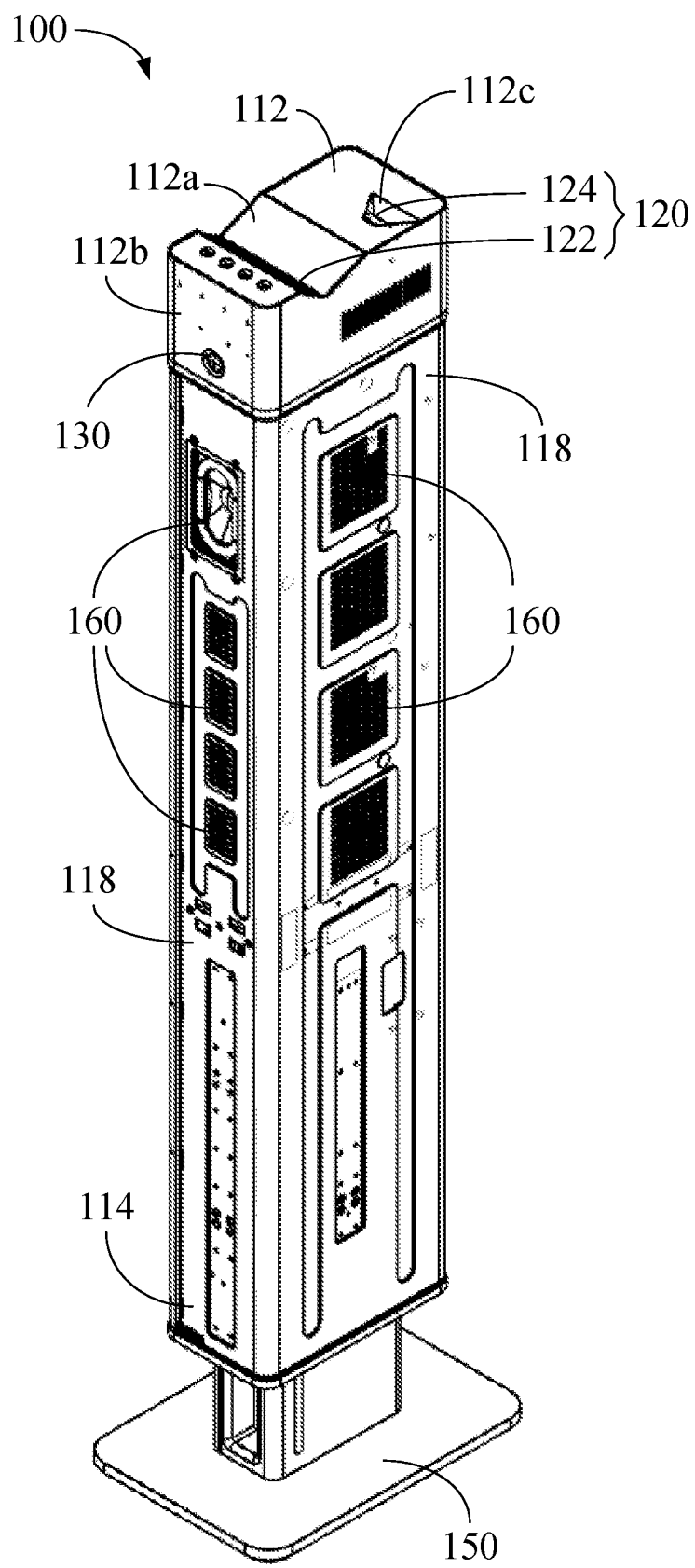
FIG. 2 is a schematic view of the upright soundbar with projection function removing a mesh housing of the present disclosure.
Figure 3:
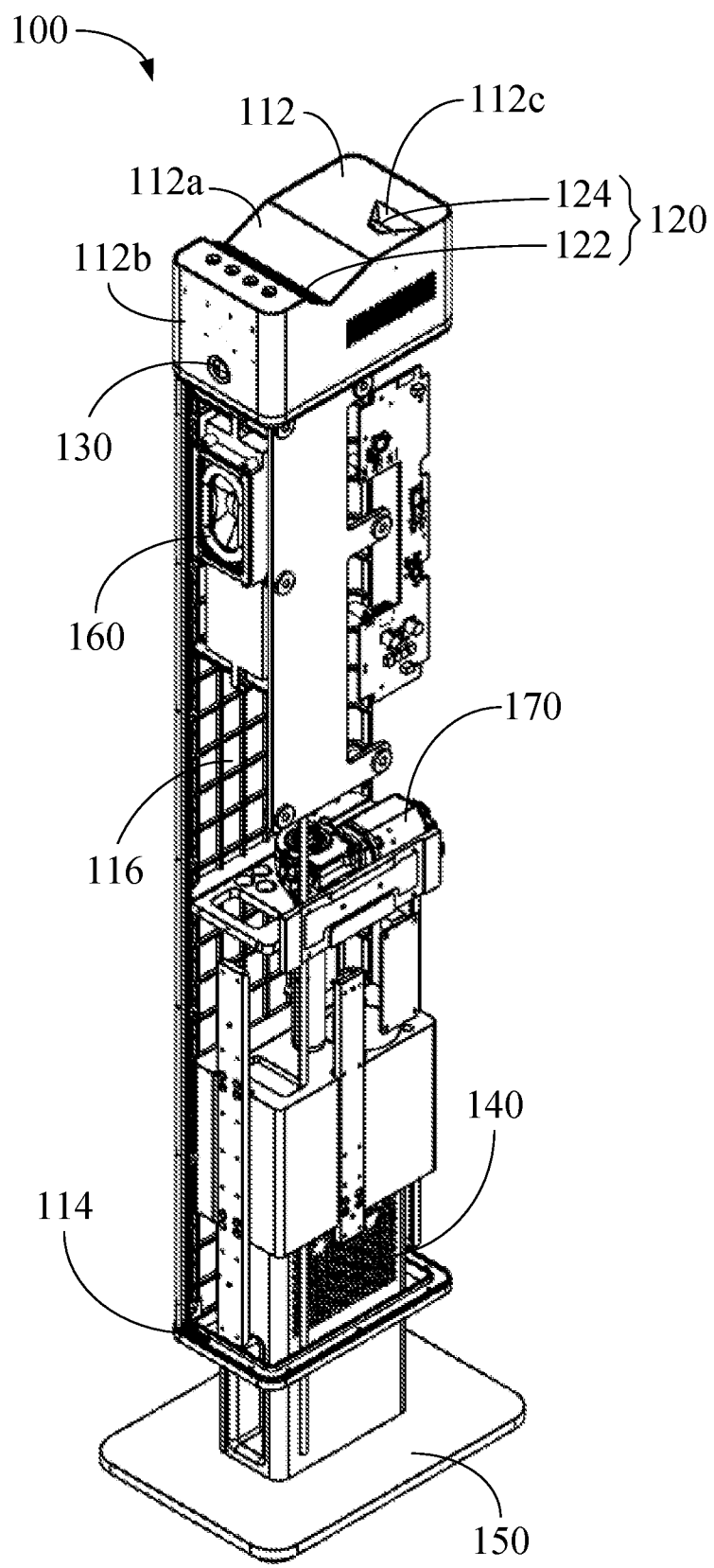
FIG. 3 is a schematic view of a receiving space of the upright soundbar with projection function of the present disclosure.

As shown in FIGS. 1, 2 and 3, an upright soundbar 100 with projection function of the present disclosure comprises an upright body 110, a projection module 120, a camera module 130, a computing module 140, and a base 150. The upright body 110 comprises a top portion 112, a bottom portion 114 disposed relative to the top portion 112, and a receiving space 116 located in the upright body 110.

Figure 4:
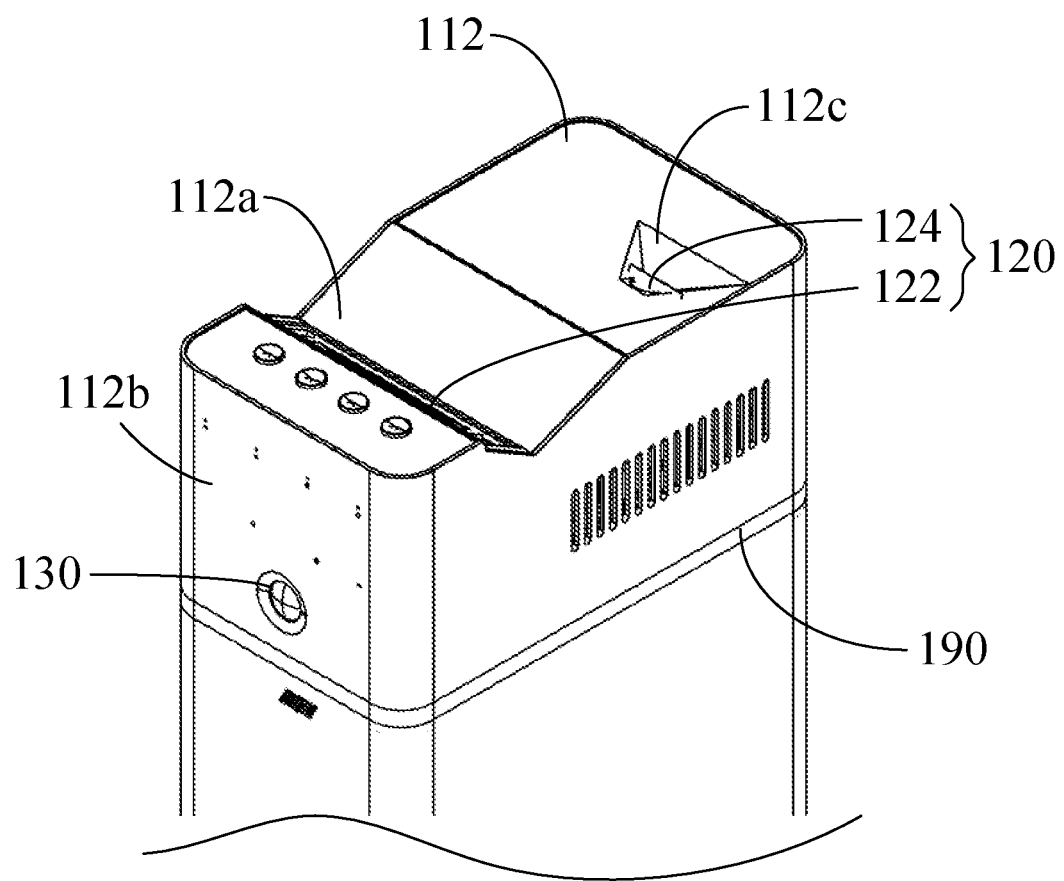
FIG. 4 to FIG. 5 are partial enlarged views of a projection module of the upright soundbar with projection function of the present disclosure.
Figure 5:
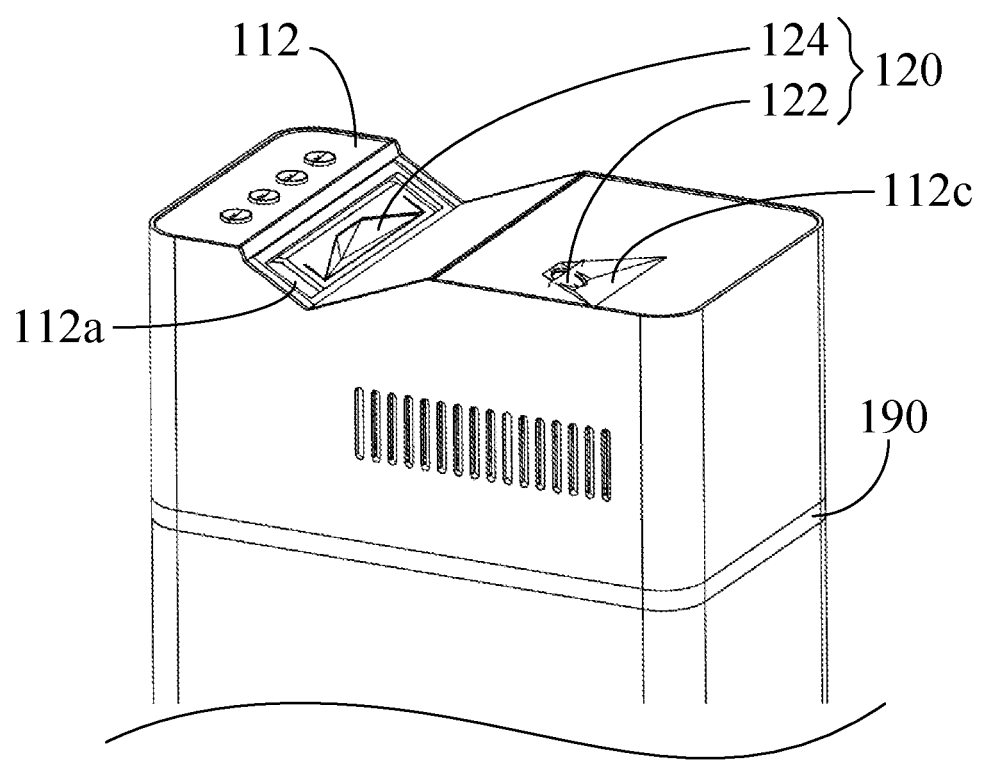
Figure 6:
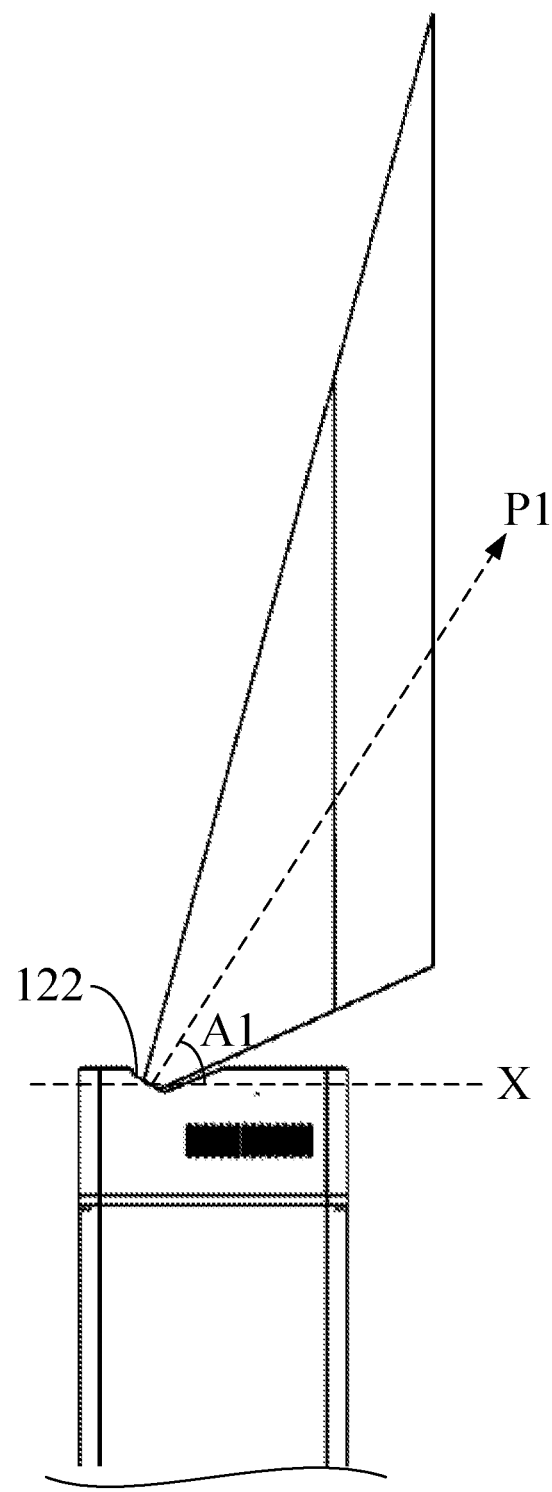
FIG. 6 is a schematic view of a projection of a first projection lens of the projection module in the upright soundbar with projection function of the present disclosure.

As shown in FIGS. 4 and 5, a first projection lens 122 of the projection module 120 is tilted. The first projection lens 122 is disposed in a first recessed area 112a of the top portion 112, and the first recessed area 112a preferably has a V-shaped depression. The camera module 130 is disposed on an end surface 112b of the top portion 112, and the end surface 112b is preferably a front-end surface of the top portion 112. As shown in FIG. 3, the computing module 140 is disposed in the receiving space 116. The base 150 is disposed on the bottom portion 114 of the upright body 110 to support the upright body 110. As shown in FIG. 6, a first projection angle A1 is between a first projection optical axis P1 of the first projection lens 122 and a horizontal line X, the first projection angle A1 ranges from 15 degrees to 60 degrees such that images projected by the first projection lens 122 is projected in an inclined manner onto a projection screen or wall surface located behind the upright soundbar 100 with the projection function of the present disclosure.

Figure 9:
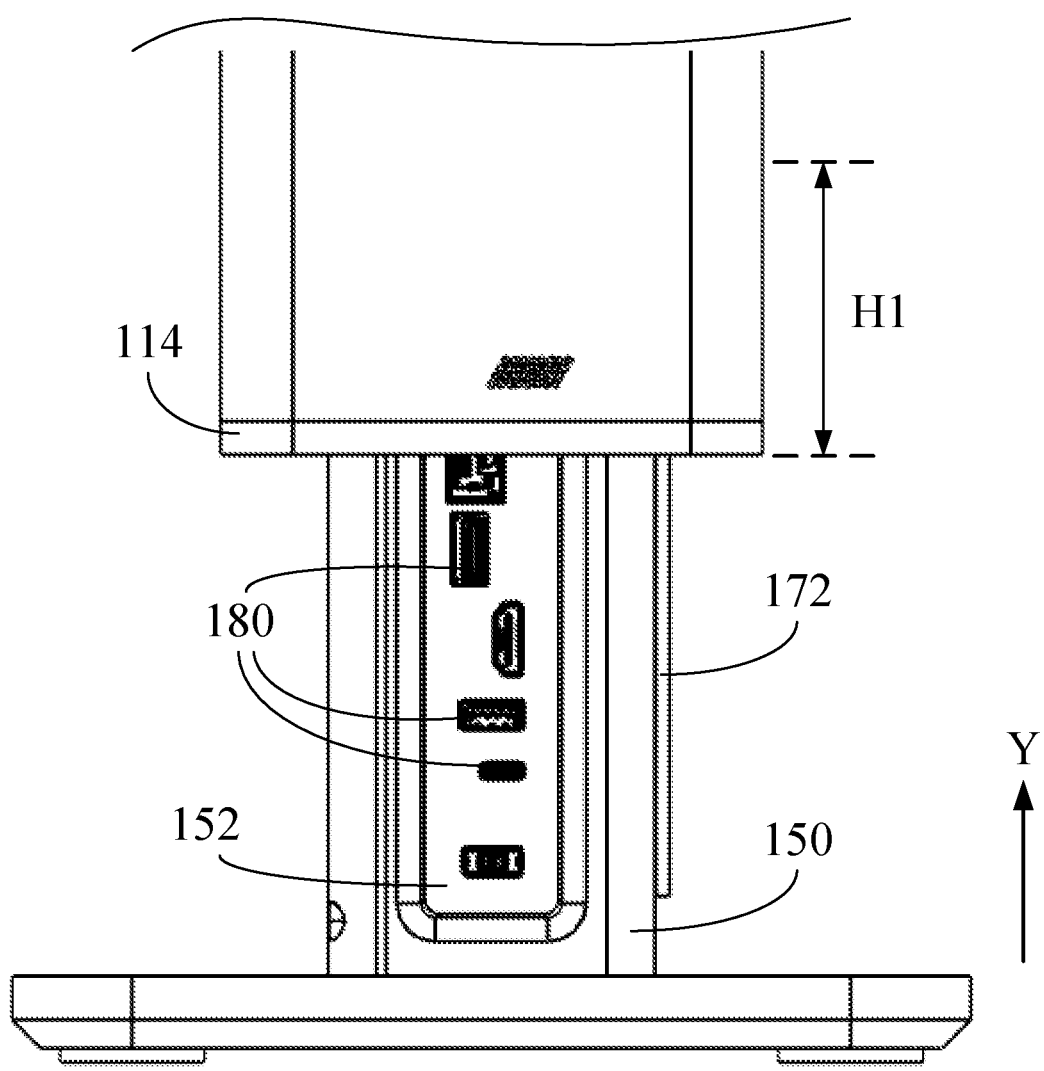
FIG. 9 is a schematic view of an inverted T-shaped base of the upright soundbar with projection function of the present disclosure.

In the present disclosure, a projection direction of the projection module 120 and a photography direction of the camera module 130 are reversed with respect to each other as shown in FIG. 4. In other words, when a user faces toward the upright soundbar 100 with projection function of the present disclosure to view the images projected by the projection module 120, the camera module 130 disposed at the end surface 112b of the top portion 112 (i.e., the front-end surface) will be able to capture the user's face for remote video conferencing interaction. Further, as shown in FIG. 9, the upright body 110 can be moved along a vertical direction Y relative to the base 150, thereby allowing the projection module 120 or the camera module 130 to be adjusted to a suitable height for meeting use.

Figure 7:
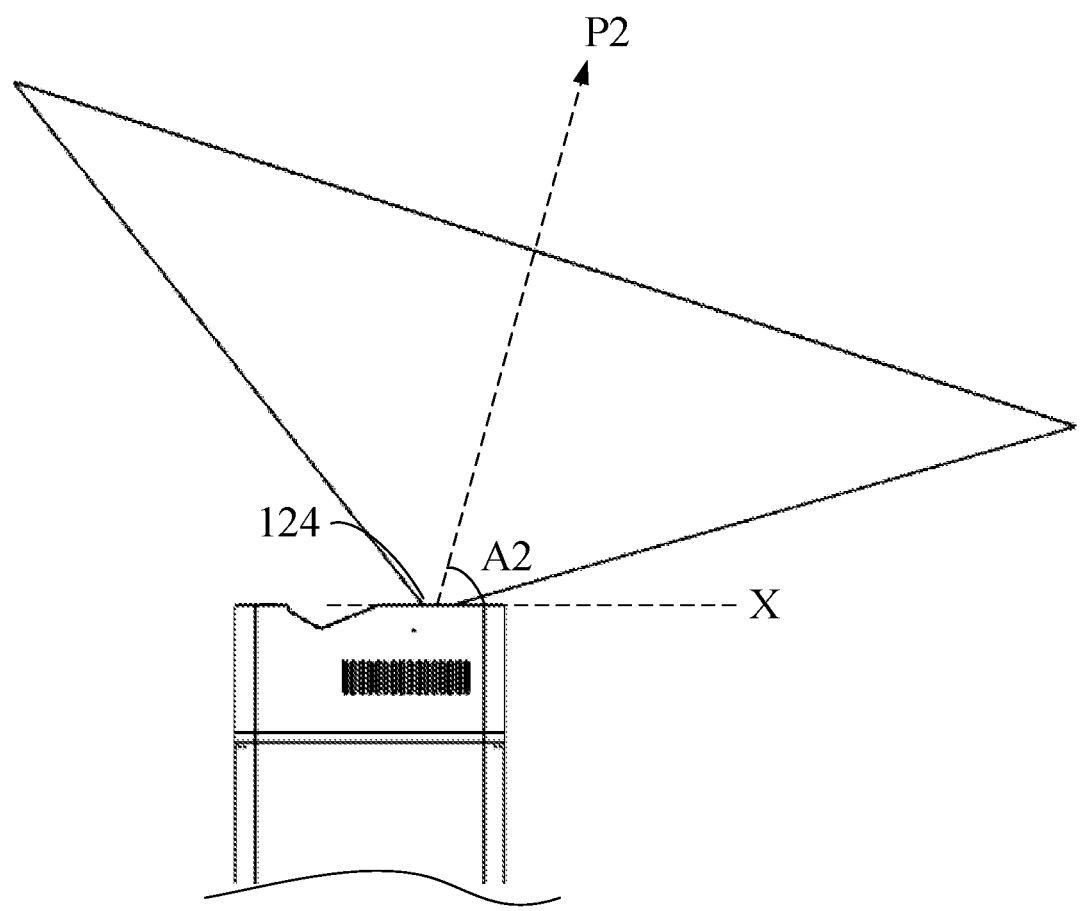
FIG. 7 is a schematic view of a projection of a second projection lens of the projection module in the upright soundbar with projection function of the present disclosure.

Please refer to FIG. 1 again. The projection module 120 may further comprise a second projection lens 124. The second projection lens 124 is tilted in a second recessed area 112c of the top portion 112, and the second recessed area 112c is preferably a smaller V-shaped recess. In detail, as shown in FIG. 7, a second projection angle A2 is between a second projection optical axis P2 of the second projection lens 124 and the horizontal line X, and the second projection angle A2 ranges from 45 degrees to 80 degrees, so that the second projection lens 124 can project images on other planes at an angle different from the images of the first projection lens 122, thus providing more flexibility in use.

Please refer to FIG. 2 continuously. The upright soundbar 100 with projection function of the present disclosure further comprises a plurality of speakers 160. The plurality of speakers 160 are disposed on a body end surface 118 of the upright body 110. The body end face 118 may be a front-end surface, a left end surface, or a right end surface of the upright body 110, and the plurality of speakers 160 comprises at least one woofer and at least one tweeter. In this way, the plurality of speakers 160 can be all disposed on the front-end surface, the left end surface, or the right end surface of the upright body 110, or disposed on two of the front-end surface, the left end surface, or the right end surface of the upright body 110, respectively, or disposed on the front-end surface, the left end surface, or the right end surface of the upright body 110, respectively, depending on design requirements. In the embodiment illustrated in FIG. 2, the plurality of speakers 160 are disposed on the front-end surface and the left end surface of the upright body 110, but this is not a limitation.

As shown in FIG. 3, the upright soundbar 100 with projection function of the present disclosure further comprises a motor 170. The motor 170 is disposed in the receiving space 116 so that it can be used to drive the upright body 110 to move a first height H1 along the vertical direction Y (as shown in FIG. 9), wherein the first height H1 ranges from 0 mm to 200 mm. That is, the motor 170 can drive the upright body 110 along the vertical direction Y to move between 0 mm and 200 mm according to a height of a conference table, sizes of a projection screen, or a projection plane.

In the upright soundbar 100 with projection function of the present disclosure, the projection module 120 is an ultra-short focus projection module and the camera module 130 is an automatic tracking camera module. Therefore, during the video conference, the upright body 110 can be driven by the motor 170 to move to a specific position along the vertical direction Y, so that the projection module 120, which is the ultra-short focus projection module, and the camera module 130, which is the automatic tracking camera module, can be adjusted to the most suitable height to complete the projection and video conference needs.

An advantage of the projection module 120 being the ultra-short focus projection module is that the upright soundbar 100 with projection function can be placed directly in front of a projection screen or a projection plane, eliminating the need to maintain a proper distance from a projection screen or a projection plane with a conventional projector. The camera module 130 being an automatic tracking camera module facilitates focusing operations during a video conference, ensuring that captured images can be automatically focused on a speaker.

As shown in FIG. 3, in the upright soundbar 100 with projection function of the present disclosure, the computing module 140 is a microcomputer host. Therefore, it can be installed in the receiving space 116 of the upright body 110 without affecting an upright shape of the upright soundbar 100 with projection function. In other words, even if the receiving space 116 is equipped with the computing module 140, the upright soundbar 100 with projection function of the present disclosure can still maintain a slender body design.

In addition to assisting in transmission of electrical signals between devices, the computing module 140 can also be linked to a stylus. Thus, when the projected images are drawn by the stylus, the relevant handwriting can be recorded in the projected images through operation of the computing module 140.

Figure 8:
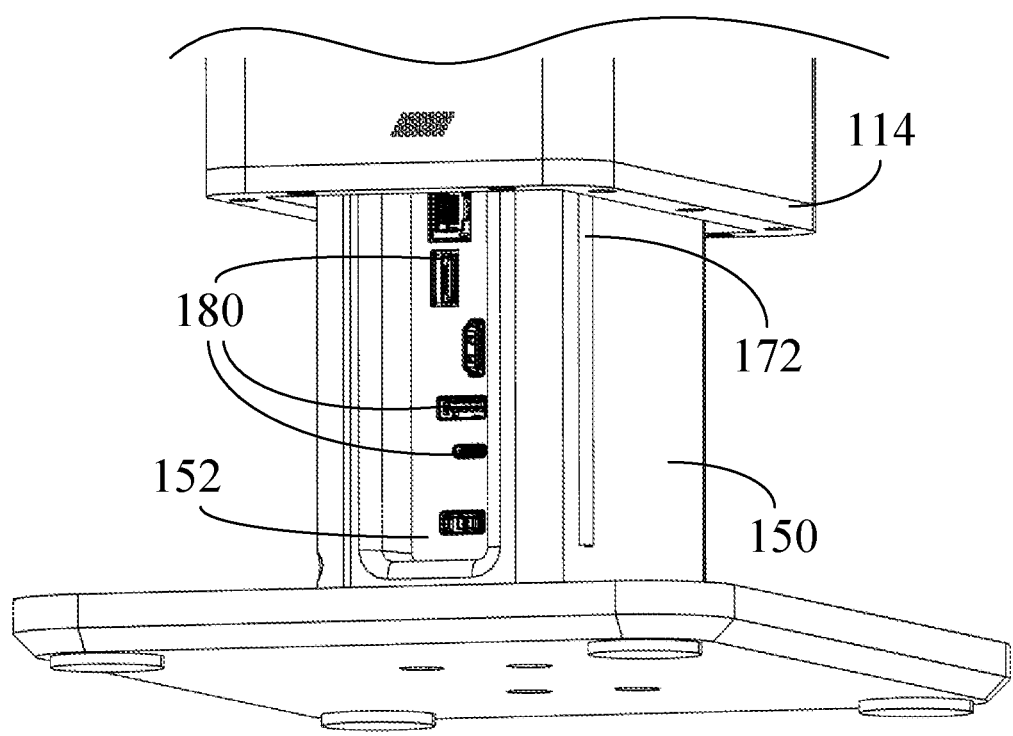
FIG. 8 is a schematic view of a plurality of transmission ports of the upright soundbar with projection function of the present disclosure.

Please refer to FIGS. 8 and 9 continuously. The upright soundbar 100 with projection function of the present disclosure may further comprise a plurality of transmission ports 180. The plurality of transmission ports 180 are disposed on a base end surface 152 of the base 150, and the base end surface 152 is not covered by the upright body 110. In other words, whether the upright body 110 is supported by the bottom portion 114 and is at a lowest point of movement along the vertical direction Y, or in a process of moving up and down along the vertical direction Y driven by the motor 170, the upright body 110 does not cover the base end surface 152 of the base 150, so that it will not affect the plug-in and use of the plurality of transmission ports 180. The plurality of transmission ports 180 are disposed in the base 150 in addition to help maintain neatness of the conference table, but also to facilitate an arrangement of transmission cables, to avoid accidentally pulling the transmission cables and making the upright soundbar 100 with projection function of the present disclosure fall over.

It should be noted that the plurality of transmission ports 180 can be transmission ports such as USB (e.g. type C), power, HDMI, DisplayPort, etc., and can therefore be used for external keyboards, mice and other devices, or for power, video or audio signal transmission.

As shown in FIG. 9, in a preferred embodiment of the upright soundbar 100 with projection function of the present disclosure, the base 150 is an inverted T-shaped base, which can more firmly support the upright body 110 and effectively prevent the upright body 110 from falling over.

The base 150 and the bottom portion 114 of the upright body 110 can be driven by the motor 170 through a transmission method such as a gear or a rack to generate a displacement of the first height H1. For example, in FIG. 8 and FIG. 9, a rack 172 may be disposed on a side of the base 150, and a mating gear (not shown) may be disposed on a corresponding side of the bottom portion 114 of the upright body 110. When the motor 170 receives a command to drive the gear, a relative movement between the gear and the rack 172 can drive the upright body 110 to move along the vertical direction Y.

Please refer to FIG. 4 again. The upright soundbar 100 with projection function of the present disclosure further comprises a light-emitting ring 190. The light-emitting ring 190 is disposed around the upright body 110 for prompting working status of the upright soundbar 100 with projection function. For example, the light-emitting ring 190 can be disposed under the top portion 112 of the upright body 110 to facilitate the user's identification. When the upright soundbar 100 with projection function is in a mute state, the light-emitting ring 190 can be shown in red, and when the upright soundbar 100 with projection function is in a working state of a video conference, the light-emitting ring 190 can be shown in green.

In addition, the light-emitting ring 190 can be further provided with adjustable blinking rate and brightness, thereby prompting more of the working status of the upright soundbar 100 with projection function of the present disclosure, such as sound signal playing, camera module 130 in operation, abnormal received signal, etc.

Please refer to FIG. 1 again. The upright soundbar 100 with projection function of the present disclosure further comprises a mesh housing 200. The mesh housing 200 has a very small mesh holes and completely covers the upright body 110, so it can effectively prevent foreign matter from intruding into the receiving space 116 of the upright body 110 and affecting operation of the computing module 140 and the motor 170. The mesh housing 200 can also provide appropriate protection for the plurality of speakers 160 to prevent the plurality of speakers 160 from being pressed or impacted by external forces during use, which may cause damage. In addition, since the projection module 120, the camera module 130, and the computing module 140 generate waste heat during use, the mesh housing 200 also has function of quickly removing the waste heat to ensure that the projection module 120, the camera module 130, and the computing module 140 can operate in a proper temperature environment, thereby prolonging service life of components such as the projection module 120, the camera module 130, and the computing module 140.

In summary, the upright soundbar 100 with projection function of the present disclosure is to change a soundbar that originally needed to be placed or suspended in a horizontal manner to an upright design, so it only needs a small area of ground space to complete an arrangement operation, and it is convenient for users to move. On the other hand, because the upright soundbar 100 with projection function of the present disclosure already has functions of a projector, a camera, etc., it can avoid compatibility problems when a plurality of devices are electrically connected to each other, and there is no need to purchase additional projectors or cameras to save related device construction costs and subsequent maintenance costs.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. An upright soundbar with projection function, comprising:
   an upright body having a top portion, a bottom portion disposed relative to the top portion, and a receiving space located in the upright body;
   a projection module, disposed in a first recessed area of the top portion;
   a camera module, disposed on an end surface of the top portion;
   a computing module, disposed in the receiving space; and
   a base, disposed on the bottom portion to support the upright body;
   wherein a first projection lens of the projection module is tilted, a first projection angle is between a first projection optical axis of the first projection lens and a horizontal line, the first projection angle ranges from 15 degrees to 60 degrees, a projection direction of the projection module and a photography direction of the camera module are reversed with respect to each other, and the upright body is movable along a vertical direction with respect to the base.

2. The upright soundbar with projection function according to claim 1, wherein the projection module comprises a second projection lens, the second projection lens is tilted in a second recessed area of the top portion, a second projection angle is between a second projection optical axis of the second projection lens and the horizontal line, and the second projection angle ranges from 45 degrees to 80 degrees.

3. The upright soundbar with projection function according to claim 1, further comprising a plurality of speakers, wherein the plurality of speakers are disposed on a body end surface of the upright body.

4. The upright soundbar with projection function according to claim 3, wherein the body end surface is a front-end surface, a left end surface or a right end surface of the upright body.

5. The upright soundbar with projection function according to claim 3, wherein the plurality of speakers comprise at least one woofer and at least one tweeter.

6. The upright soundbar with projection function according to claim 1, further comprising a motor, wherein the motor is disposed in the receiving space, the motor drives the upright body to move a first height along the vertical direction, and the first height ranges from 0 mm to 200 mm.

7. The upright soundbar with projection function according to claim 1, wherein the projection module is an ultra-short focus projection module.

8. The upright soundbar with projection function according to claim 1, wherein the camera module is an automatic tracking camera module.

9. The upright soundbar with projection function according to claim 1, wherein the computing module is a microcomputer host.

10. The upright soundbar with projection function according to claim 1, further comprising a plurality of transmission ports, wherein the plurality of transmission ports are disposed at a base end surface of the base, and the base end surface is not covered by the upright body.

11. The upright soundbar with projection function according to claim 1, wherein the base is an inverted T-shaped base.

12. The upright soundbar with projection function according to claim 1, further comprising a light-emitting ring, wherein the light-emitting ring is disposed around the upright body.

13. The upright soundbar with projection function according to claim 1, further comprising a mesh housing, wherein the mesh housing covers the upright body.

* * * * *